United States Patent [19]

Joshi et al.

[11] 4,317,874

[45] Mar. 2, 1982

[54] SELF HEALING CATHODES

[75] Inventors: Ashok V. Joshi, Fishkill, N.Y.; Albert L. Gillotti, Churchville; William P. Sholette, Warminister, both of Pa.

[73] Assignee: Ray-O-Vac Corporation, Madison, Wis.

[21] Appl. No.: 200,279

[22] Filed: Oct. 24, 1980

[51] Int. Cl.$^3$ .............................................. H01M 4/60
[52] U.S. Cl. ...................................... 429/213; 429/218
[58] Field of Search ................ 429/213, 214, 218, 40, 429/42, 105

[56] References Cited

U.S. PATENT DOCUMENTS

| | | | |
|---|---|---|---|
| 3,160,531 | 12/1964 | Spindler | 429/218 |
| 3,660,164 | 5/1972 | Hermann et al. | 429/213 X |
| 4,042,756 | 8/1977 | Goebel et al. | 429/218 X |
| 4,127,708 | 11/1978 | Liang et al. | 429/213 X |
| 4,182,797 | 1/1980 | Kondo et al. | 429/213 X |
| 4,211,832 | 7/1980 | Mueller et al. | 429/213 X |
| 4,224,389 | 9/1980 | Peled | 429/213 X |
| 4,246,327 | 1/1981 | Skoistod et al. | 429/105 |

*Primary Examiner*—Charles F. LeFevour
*Attorney, Agent, or Firm*—Raymond J. Kenny; Francis J. Mulligan, Jr.

[57] ABSTRACT

High energy density, self-healing cathodes for use in solid state or quasi-solid state electrochemical cells having active metal, e.g. lithium, one or more of materials existing in the solid or liquid state at ordinary temperatures and selected from the group of oxides of phosphorous and boron, halides of phosphorous and boron chalcogenides of phosphorous and boron and oxyhalides of phosphorous and boron, said mass having induced therein a useable degree of electronic conductivity. One example of a means of including a useable amount of electronic conductivity is the inclusion in the cathode mass of a charge transfer complex of a polymer of the type of poly-2-vinyl pyridine.

5 Claims, No Drawings

SELF HEALING CATHODES

The present invention is concerned with cathode materials, and more particularly, with cathode materials adapted to be employed in solid state or quasi-solid state electrochemical cells using active metals as the anode.

HISTORY OF THE PRIOR ART AND PROBLEM

In state of the art solid state cells, using the lithium-iodine system a particular type of iodine cathode is known. In this cathode the iodine is in the form of a charge transfer complex with a polymer such as poly-2-vinyl pyridine (P2VP). While solid state electrochemical cells using this known cathode are practical, it would be advantageous to provide cathodes which have a lower vapor pressure and which give, with a specified anode, higher voltage and therefore higher energy density.

DISCOVERY AND OBJECTS

It is an object of the present invention to provide novel cathodes.

Another object of the present invention is to provide electrochemical cells including the novel cathode materials of the present invention.

Other objects and advantages will become apparent from the following description.

GENERAL DESCRIPTION

The present invention contemplates as cathodes adapted for use in electrochemical cells employing an active metal anode, a solid or semi-solid mass of one or more of materials existing in the solid or liquid state at ambient atmospheric temperatures and selected from the group consisting of the oxides of boron or phosphorus, the halides of phosphorus or boron, the chalcogenides of boron or phosphorus and the oxyhalides of boron or phosphorus, said mass being made electrically conductive in any known manner. The cathodes of the present invention can be made electronically conductive by doping or by inclusion of an electronic conductor such as a charge transfer complex or an inert solid state electronic conductor such as carbon.

The cathodes of the present invention are particularly advantageous in that they, like the conventional state of the art, iodine polymer charge transfer complex cathodes, are self-healing. When employed in a solid state cell along with an active metal anode, such as lithium, sodium, potassium and the like, contact between the active metal and the cathode material of the present invention results in the immediate formation of the active metal oxide, halide or chalcogenide in the area of the contact of the anode and cathode. This oxide, halide or chalcogenide of the active metal is an electronic insulator but to more or less degree, an electrolytic conductor and thus forms a thin layer of electrolyte between the anode and the cathode. Contact between the anode and the cathode also results in the reduction to elemental state of the phosphorus or boron. Both boron and phosphorus deposit in the form of neutral particles which are both electronic and electrolytic insulators and therefore do not contribute to shorting of the electrochemical cell.

Advantageous embodiments of the present invention include electrochemical cells wherein lithium is the active metal and the cathodes contain, a polymer charge transfer complex of one or more materials selected from the group consisting of phosphorus pentoxide, boron trioxide, phosphorus pentabromide, phosphorus pentaiodide, phosphorus pentachloride, boron triiodide, phosphorus trisulfide, phosphorus decasulfide, boron trisulfide and phosphorus oxybromide. The polymer in the charge transfer complexing agent is advantageously P2PV. However, other materials monomeric or polymeric, can be used as the charge transfer complexing agent. For example, as disclosed in U.S. Pat. No. 3,660,164, the charge transfer complexing agent can be prepared using as donor components many different polycyclic aromatic compounds such as napthalene, anthracene, pyrene, perylene and violanthrene, for example all of which are condensed aromatic compounds in which the ring-forming atoms are exclusively carbon atoms; or polycyclic aromatic hydrocarbons containing heteroatoms such as nitrogen or sulfur, as exemplified by acridine, phenazine, phenothiazine and the like; or polycyclic aromatic hydrocarbons containing one or more electron donating substituents such as alkyl, alkoxy, amino or dimethylamino or tetramethylammonium groups. These groups improve the electron donating property of the polycyclic aromatic hydrocarbon. Such compounds include, for example, mono- and diamino anthracene, dimethyl anthracene, diaminopyrene, dimethylaminopyrene and tetramethylbenzidine.

The substituted or unsubstituted polycyclic hydrocarbons may be incorporated into a polymeric chain, or polymers may be synthesized having the above substituted or unsubstituted polycyclic hydrocarbons as side chains. Known polymers of this type include, for example, poly-N-vinylcarbazole, poly-2-vinyl-quinoline, poly-2-vinylpyridine, poly-4-vinylpyridine, poly-1-vinylnaphthalene, poly-2-vinylnapthalene and polyphenyl. Because it has been found by the art to be highly advantageous, poly-2-vinyl pryridine (P2VP) is used for the purpose of exemplifying the present invention.

As will be obvious to those of normal skill in the art, the necessary degree of electronic conductivity of the cathodes of the present invention depends upon the design parameters of the cell in which the cathodes are used. Such design parameters include thickness of cathode layer, character and configuration of the current collector and designed discharge current. Because these parameters can vary widely, it is impossible to specify the amount of any given type of electronic conductivity enhancing means that should be employed. It can be said that cathodes of the present invention must have induced therein a useable degree of electronic conductivity, which is a function of the design parameters mentioned hereinbefore. The following examples can be a guide in this regard for those of normal skill in the art.

EXAMPLES

Example I 33.3 grams of $PI_5$ (20.6 gms of $PI_3$ + 12.7 gms of $I_2$) were mixed with 1 gm of P2VP and heated to about 300° F. for ½ an hour until the mixture was liquified. The liquified mixture was then poured on to a plastic sheet and allowed to cool. From this mixture a ball weighing 0.70 grams was prepared. The ball was then flattened and shaped into a cathode disc using a stainless steel die. The cathode was then placed into the bottom can of a button cell. The anode assembly consisting of a lithium disc welded to the top can was then placed over the bottom cathode assembly with a grommet in between and the cell was then crimped in a closure press at 3000 pounds of pressure. The cell showed 2.8 volts and 2 mAmps short circuit current (SCC).

EXAMPLE II

A mixture of $PBr_5 + I_2 + P2VP$ (10:10:0.5 weight ratio) was heated to about 300° C. for about ½ an hour until it liquified. The mixture was then allowed to cool. At room temperature, the mixture remained a tar-like substance. The identical procedure was used for fabrication of the cell as described in Example I for $PI_5$ active material. About 0.5 gm of cathode material was used in each cell. The O.C.V. of the was $3.27\pm0.1$ volts and short circuit current was 7 mAmps.

Example III 11.5 gms of $POBr_3$, 10.2 gms of $I_2$ and 1 gm of P2VP were mixed together and heated to 150° C. for about ½ an hour until liquified. The melt was quenched to room temperature. The mixture remained a tar-like, pasty substance. About 0.5 gm of cathode was used to fabricate each cell. The identical procedure was used as in Examples I and II for fabricating the cells. The cells showed O.C.V. of $3.1\pm0.02$ volts and S.C.C. of 3 mAmps.

Example IV

Lithium/$POBr_3$ cell was made was follows:

(a) A mixture of 15 parts iodine crystals to 1 part of P2VP powder was heated to about 150° C. to liquify and then poured onto a plastic sheet and allowed to cool. From this mixture, a ball weighing 0.25 gm was formed.

(b) 0.75 gm $POBr_3$ was heated until liquid and mixed in with the ball to form a soft tar-like substance. Using a spatula, this substance was spooned into the top section of a button cell.

(c) The bottom section of the button cell consisted of a 0.56 mm thick lithium disc pressed firmly into the can. The two parts were placed together with a grommet in between, using no separator and closed with a hydraulic closure press.

Immediate open circuit voltage for the above cell was 3.08 V. The addition of the iodine/poly-2 vinylpyridene was made to ensure conductivity in the cathode mix. No separator was initially built into the cell, as a separator-electrolyte layer forms automatically by the reaction of lithium with the cathode mix to yield the ionically conductive products LiI and LiBr.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A high energy density, self-healing cathode adapted for use in electrochemical cells employing an active metal anode comprising a solid or semi-solid mass containing a charge transfer complex and one or more materials existing in the solid or liquid state at ambient atmospheric temperatures and selected from the group consisting of oxide of phosphorus, oxides of boron, halides of phosphorus, halides of boron, chalcogenides of phosphorus, chalcogenides of boron, oxyhalides of phosphorus and oxyhalides of boron, said mass having a usable degree of electronic conductivity.

2. A cathode as in claim 1 wherein the charge transfer complex is a complex of iodine with poly-2-vinvlpyridine.

3. A cathode as in claim 2 which contains phosphorus pentaiodide.

4. A cathode as in claim 2 which contains phosphorus pentabromide.

5. A cathode as in claim 2 which contains phosphorus oxybromide.

* * * * *